Aug. 24, 1965
L. PÉRAS
3,202,901
PILOT LAMP MOUNTING IN THE CIRCUIT FOR
CHARGING A BATTERY FROM AN ALTERNATOR
Filed Sept. 24, 1962
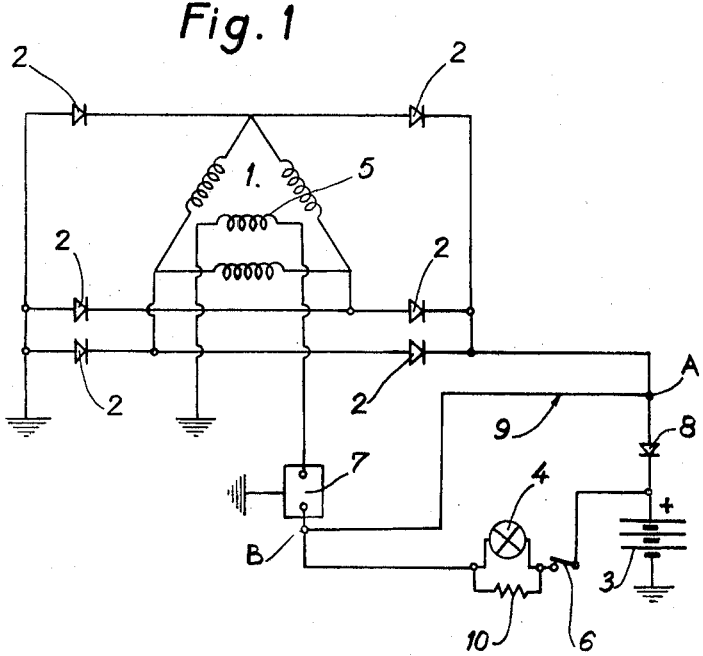
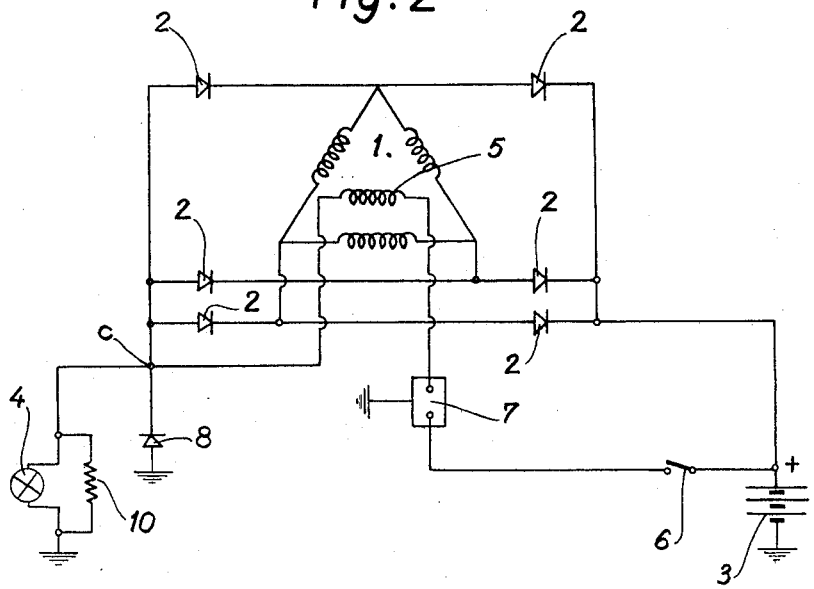
Inventor
Lucien Peras
By Stevens, Davis, Miller & Mosher
Attorneys

United States Patent Office 3,202,901
Patented Aug. 24, 1965

3,202,901
PILOT LAMP MOUNTING IN THE CIRCUIT FOR CHARGING A BATTERY FROM AN ALTERNATOR
Lucien Péras, Billancourt, France, assignor to Regie Nationale des Usines Renault, Billancourt, France
Filed Sept. 24, 1962, Ser. No. 225,516
Claims priority, application France, Oct. 5, 1961, 875,152, Patent 1,309,402
1 Claim. (Cl. 320—48)

It is known to charge a storage battery, notably in automotive vehicles, by using an alternator driven from the vehicle engine, the current being adequately rectified by means of dry or diode-type rectifiers; the so-called De Graetz bridge mounting is also known wherein six rectifying diodes are associated with a delta-connected alternator.

It is further conventional practice in circuit arrangements of this character to provide a pilot-lamp or warning light inserted in the energizing circuit which is lighted when said excitation circuit is operative and the alternator is not driven, and fades out and remains out when the alternator rotates.

In hitherto known mountings the pilot lamp was inserted on the positive side of the excitation circuit and shunted on this circuit across the terminals of a so-called isolating diode mounted in the battery charging circuit.

However, this mounting suffers from various drawbacks to be explained presently.

It is the chief object of this invention to provide a circuit arrangement for the purpose specified hereinabove wherein the isolating diode and the pilot lamp or warning light are disposed in the negative circuit section, i.e. on the grounded side with respect to the alternator.

The invention and the advantageous features characterizing same are set forth more in detail hereinafter with reference to the accompanying drawing in which:

FIGURE 1 is a circuit diagram showing the known arrangements given for comparison purposes, and FIGURE 2 is acircuit diagram showing the warning light mounting according to this invention.

Referring first to FIG. 1, it is known to use an alternator 1 of the Delta type, inserted in a so-called "De Graetz" bridge comprising six diodes 2 for charging a storage battery 3.

It is also known to check the operation of the alternator by means of a pilot lamp or warning light 4 inserted in the conductor section connected to the positive terminal of the battery in the circuit delivering current to an excitation winding 5 of the alternator and comprising a switch 6 and a voltage regulator 7; in this case, an isolating diode 8 is inserted in the conductor delivering current to the battery and a conductor 8 connects the regular input to the input terminal of the diode.

This device operates as follows:

When switch 6 is closed but the alternator 1 is not driven, the excitation winding 5 of the alternator is fed from the regulator 7 through the lamp 4 inserted in series between the switch and the regulator, the diode 8 preventing the "A" point and therefore the "B" point from attaining the positive voltage of the + battery terminal; thus, the lamp 4 is on. When the alternator rotates and therefore delivers current, the "A" point becomes positive and the diode short-circuits the lamp which fades out and remains out; in fact the voltage across the lamp terminals is equal to the voltage drop ΔU in the diode, and ΔU is not sufficient to re-light the lamp.

As the lamp 4 is used for exciting the alternator when the latter is started, a resistance 10 is connected in parallel across the lamp terminals so that the circuit is not affected by a posible failure of the lamp filament.

This circuit arrangement is attended by the following drawbacks:

(1) As the diode 8 has a positive potential, its radiator must be isolated from the alternator shell and is therefore difficult to cool properly (in fact, the whole of the current delivered by the alternator flows through this diode which is obviously heated to a degree considerably higher than the six diodes of the De Graetz bridge).

(2) As the same diode 8 and its radiator receive positive voltage, short-circuits are most likely to occur during repair or maintenance works on the vehicle.

(3) Finally, as the diode 8 and its radiator are fastened on the alternator they are most likely to interfere with, and constitute a risk of breakage during, handling and other operations.

It is therefore the essential object of this invention to provide an arrangement whereby the drawbacks set forth hereinabove are eliminated or at least minimized considerably while ensuring a better cooling of the diode, a more reliable mechanical protection and eliminating any risk of short-circuit.

To this end, the present invention provides a warning light mounting in a circuit of the type set forth hereinabove wherein the diode is disposed in the negative section of the alternator circuit and the warning light is shunted on this diode, with a resistance connected across the lamp terminal as in the conventional arrangement. FIG. 2 illustrates this modified arrangement wherein the same constituents are designated by the same reference numerals as in FIG. 1. It will be seen that the negative section of the excitation circuit is connected to the negative conductor of the alternator, the assembly being grounded through the diode 8 on the one hand and through the light 4 on the other hand.

Thus, when the engine of the vehicle is started, the circuit from the battery is closed through switch 6, regulator 7, excitation winding 5 and lamp 4, the diode 8 preventing the point "G" from attaining the ground potential. When the alternator rotates, the diode 8 short circuits the lamp 4 as in the first case.

With this arrangement the diode can be mounted inside or embedded in one of the bearings of the machine, so that it is properly cooled by the machine assembly. Thus, it will not project therefrom and in addition any risk of short-circuit is precluded, for all accessible component elements are at ground potential.

While a preferred embodiment of the invention has been described hereinabove with reference to the accompanying drawing, it will be readily understood by anybody conversant with the art that many modifications and alterations may be brought thereto without departing from the spirit and scope of the invention as set forth in the appended claim.

I claim:

Electrical circuit for charging a battery in an automotive vehicle, comprising an alternator with an excitation circuit, said alternator having a first set of output-terminals a voltage regulator for said alternator having a first terminal and a second terminal, a Graetz bridge consisting of diodes with a second set of output-terminals, said first set of output-terminals connected to said Graetz bridge, one of said second output-terminals of said Graetz bridge being connected to the positive pole of said battery, a pilot lamp, one pole of said pilot lamp being grounded and the other pole of said pilot lamp being connected to the other of said second set of output-terminals of said bridge, a diode shunting said pilot lamp being connected to said other terminal of said second set of output-terminals of said bridge and being gorunded, the said excitation circuit having output-terminals, one of said terminals being connected to the other of said second set of output-terminals of the bridge, and the other of said excitation circuit output-terminals being connected to said first terminal of said regulator, a conductor connecting said second terminal of said regulator to the positive pole of said battery, and a switch in said conductor.

References Cited by the Examiner
UNITED STATES PATENTS 3,022,456 2/62 Larson et al. _____ 322—99
3,138,751 6/64 Brewster _____ 320—68

LLOYD McCOLLUM, *Primary Examiner.*

MILTON O. HIRSHFIELD, *Examiner.*